United States Patent
Beierl

(10) Patent No.: US 12,459,315 B2
(45) Date of Patent: Nov. 4, 2025

(54) MOTOR VEHICLE BODY WITH AN AIR-GUIDING DEVICE AND WITH A TRAILER COUPLING MOUNTING DEVICE

(71) Applicant: Dr. Ing. h.c. F. Porsche Aktiengesellschaft, Stuttgart (DE)

(72) Inventor: Dominik Beierl, Korntal-Münchingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 678 days.

(21) Appl. No.: 17/737,124

(22) Filed: May 5, 2022

(65) Prior Publication Data
US 2022/0355632 A1 Nov. 10, 2022

(30) Foreign Application Priority Data
May 6, 2021 (DE) ...................... 10 2021 111 749.6

(51) Int. Cl.
| B60D 1/54 | (2006.01) |
| B60D 1/06 | (2006.01) |
| B60D 1/60 | (2006.01) |
| B62D 35/00 | (2006.01) |

(52) U.S. Cl.
CPC .................. B60D 1/54 (2013.01); B60D 1/60 (2013.01); B62D 35/007 (2013.01); *B60D 1/06* (2013.01)

(58) Field of Classification Search
CPC ... B60D 1/54; B60D 1/60; B60D 1/06; B62D 35/007
USPC ...................................................... 280/491.3
See application file for complete search history.

(56) References Cited

U.S. PATENT DOCUMENTS

| 614,981 | A | 11/1898 | Ream |
| 2,544,185 | A | 3/1951 | Sargent |
| 5,628,536 | A | 5/1997 | Fulkerson |
| 6,149,181 | A | 11/2000 | Biederman |
| 6,189,910 | B1 * | 2/2001 | Bartel ..................... B60D 1/06 280/491.1 |
| 6,402,178 | B1 | 6/2002 | Ifflaender |
| 6,874,806 | B1 | 4/2005 | Blake |

(Continued)

FOREIGN PATENT DOCUMENTS

| DE | 19654867 A1 | 8/1997 |
| DE | 19944082 A1 | 3/2001 |

(Continued)

*Primary Examiner* — Alentin Neacsu
(74) *Attorney, Agent, or Firm* — Buchanan Ingersoll & Rooney PC

(57) ABSTRACT

A motor vehicle body with an air-guiding device and with a trailer coupling mounting device. The air-guiding device is formed in a rear-end region of the motor vehicle body. The trailer coupling mounting device is adjustable into a rest position and into an active position. The trailer coupling mounting device, in at least the rest position, is at least partially covered with respect to surroundings by the air-guiding device, which is settable into a first operating position and a second operating position. For positioning the trailer coupling mounting device into its active position, the air-guiding device is settable into its second operating position and, after or together with the positioning of the air-guiding device into its second operating position, the trailer coupling mounting device is configured to be movable along a body vertical axis (Z) of the motor vehicle body.

16 Claims, 3 Drawing Sheets

(56) References Cited

U.S. PATENT DOCUMENTS

| | | | |
|---|---|---|---|
| 7,338,064 | B1 | 3/2008 | Williams |
| 9,283,999 | B2 * | 3/2016 | Wolf .................. B62D 37/02 |
| 9,327,780 | B1 | 5/2016 | Bird et al. |
| 9,981,516 | B1 * | 5/2018 | Alvarez ................ B60D 1/06 |
| 10,252,590 | B2 * | 4/2019 | Jackson ................ B60D 1/40 |
| 10,676,140 | B2 | 6/2020 | Wolf et al. |
| 10,857,846 | B1 | 12/2020 | Jacobs |
| 11,220,145 | B2 | 1/2022 | Rimmelspacher et al. |
| 12,097,909 | B2 * | 9/2024 | Beierl ................ B62D 35/007 |
| 2005/0161904 | A1 | 7/2005 | McJunkin |
| 2008/0029996 | A1 | 2/2008 | Mater et al. |
| 2011/0204594 | A1 | 8/2011 | Thompson et al. |
| 2013/0147157 | A1 | 6/2013 | Lee et al. |
| 2017/0136837 | A1 | 5/2017 | Merino et al. |
| 2019/0009841 | A1 * | 1/2019 | Wolf ................ B62D 35/007 |
| 2021/0023897 | A1 | 1/2021 | McManus |
| 2022/0194151 | A1 | 6/2022 | Hernandez |
| 2022/0219500 | A1 | 7/2022 | Shaeff et al. |
| 2022/0355631 | A1 | 11/2022 | Beierl |
| 2022/0355632 | A1 * | 11/2022 | Beierl ................ B60D 1/54 |
| 2022/0355633 | A1 * | 11/2022 | Beierl ................ B62D 37/02 |
| 2025/0214422 | A1 * | 7/2025 | Betcher ............... B60R 22/48 |

FOREIGN PATENT DOCUMENTS

| | | | |
|---|---|---|---|
| DE | 10045296 | A1 | 4/2001 |
| DE | 10004523 | A1 * | 8/2001 ............. B60D 1/54 |
| DE | 102012014176 | A1 * | 1/2014 ............. B60D 1/60 |
| DE | 102014116000 | A1 | 5/2016 |
| DE | 102016111158 | A1 | 12/2016 |
| DE | 102016204846 | A1 | 9/2017 |
| DE | 102013019503 | C5 | 10/2018 |
| DE | 102017114863 | A1 | 1/2019 |
| EP | 1400379 | A1 | 3/2004 |
| EP | 1782973 | A2 | 5/2007 |
| FR | 3072640 | A1 | 4/2019 |
| GB | 2578153 | A | 4/2020 |
| KR | 20080021912 | A | 3/2008 |
| WO | 2019077101 | A1 | 4/2019 |

* cited by examiner

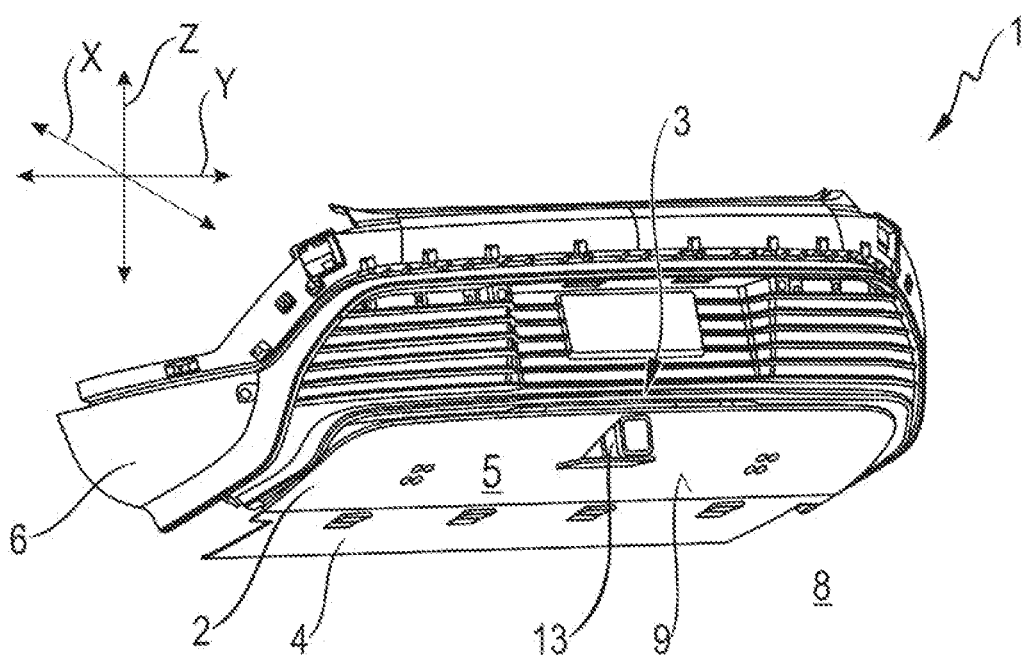
Prior art  Fig. 1
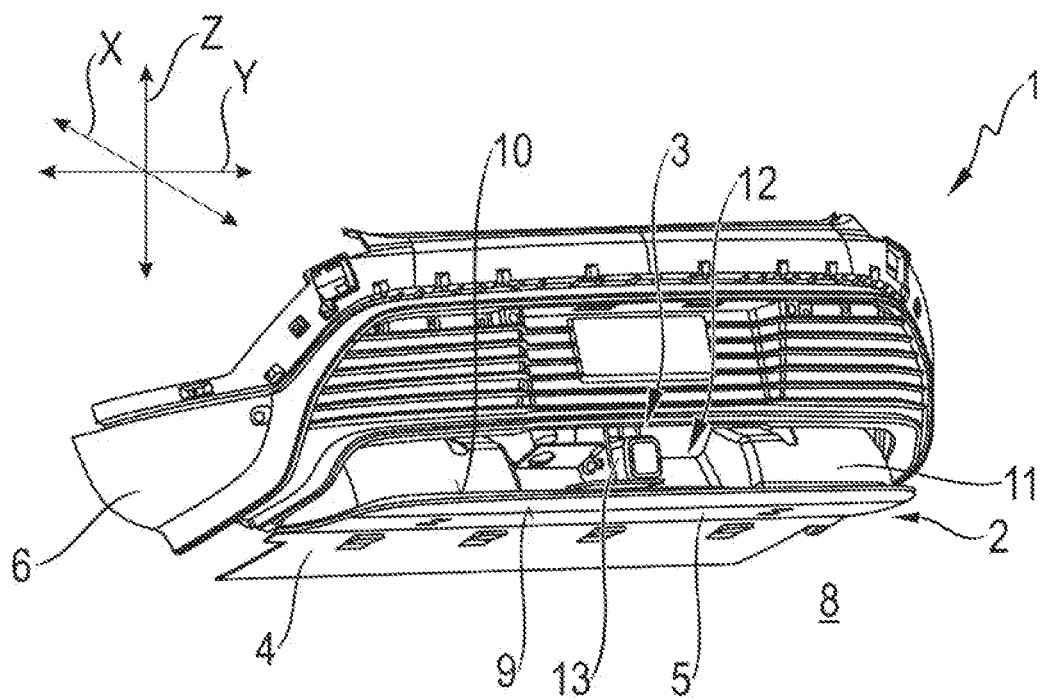
Prior art  Fig. 2

MOTOR VEHICLE BODY WITH AN AIR-GUIDING DEVICE AND WITH A TRAILER COUPLING MOUNTING DEVICE

CROSS-REFERENCE TO RELATED APPLICATION

This application claims priority to German Patent Application No. 10 2021 111 749.6, filed May 6, 2021, the content of such application being incorporated by reference herein in its entirety.

FIELD OF THE INVENTION

The present invention relates to a motor vehicle body with an air-guiding device and with a trailer coupling mounting device

BACKGROUND OF THE INVENTION

Air-guiding devices for influencing an air flow passing around the motor vehicle body are known. For example, air-guiding devices are also used in the rear-end region of the motor vehicle body. Such air-guiding devices may for example be so-called rear-end diffusers, which make it possible to realize a defined air flow in the rear-end region of the motor vehicle body.

The rear-end diffuser is provided for forming an active surface in an underbody region of the motor vehicle body, which serves to improve the aerodynamics. By means of the rear-end diffuser, it is for example possible for road grip to be significantly improved in particular during lateral acceleration maneuvers. The rear-end diffuser is in principle configured in the form of a flap which is arranged in the rear-end region close to the underbody, wherein a trailer coupling mounting device of the motor vehicle body is likewise arranged in this region.

In order that an air resistance of the motor vehicle body is as low as possible in all operating ranges of a motor vehicle that has the motor vehicle body, it is advantageous for the trailer coupling mounting device, when it is not required, to be completely covered with respect to surroundings in order that turbulence caused in the rear-end region of the motor vehicle body by the trailer coupling mounting device does not lead to an increase in the air resistance. The complete coverage of the trailer coupling mounting device in its so-called rest position means that, to position the trailer coupling mounting device into its active position, coordination is necessary between the positioning of the trailer coupling mounting device and the positioning of the air-guiding device.

WO 2019/077101 A1, which is incorporated by reference herein, discloses a motor vehicle body with an air-guiding device and with a trailer coupling mounting device, wherein the air-guiding device is configured to be adjustable and the trailer coupling mounting device is configured to be removable.

DE 10 2012 014 176 A1, which is incorporated by reference herein, presents a motor vehicle body with an air-guiding device and with a trailer coupling mounting device, wherein, before the trailer coupling mounting device is positioned into its active position, the air-guiding device is pivoted out toward the roadway in order that a coupling element of the trailer coupling mounting device can be pivoted about a motor vehicle longitudinal axis of the motor vehicle body. After the coupling element has been positioned into its active position, the air-guiding device is pivoted upward again, that is to say in the direction away from the roadway, wherein the coupling element is received in a cutout of the air-guiding device, which cutout can be closed by means of a cover element after the coupling element has been removed.

GB 2578153 A1, which is incorporated by reference herein, has disclosed a motor vehicle body with an air-guiding device and with a trailer coupling mounting device, wherein the air-guiding device is received in adjustable fashion on the motor vehicle body and has a sensor for detecting a trailer fastened to a coupling element of the trailer coupling mounting device.

SUMMARY OF THE INVENTION

One aspect of the invention relates to a motor vehicle body comprising an air-guiding device and a trailer coupling mounting device, wherein the air-guiding device is formed in a rear-end region of the motor vehicle body. The trailer coupling mounting device is adjustable into a rest position and into an active position, wherein the trailer coupling mounting device, in at least the rest position, is at least partially covered with respect to surroundings by means of the air-guiding device. The air-guiding device is settable into a first operating position and a second operating position. According to aspects of the invention, for the positioning of the trailer coupling mounting device into its active position, the air-guiding device is settable into its second operating position and, after or together with the positioning of the air-guiding device into its second operating position, the trailer coupling mounting device is configured to be movable along a body vertical axis of the motor vehicle body. In other words, this means that, for the positioning of the trailer coupling mounting device, which is adjustable along the body vertical axis, the air-guiding device must be pivoted into its second operating position. The advantage is that, for the positioning of the trailer coupling mounting device, the air-guiding device can be pivoted straight into its second operating position, that is to say without having to adopt further intermediate positions between the first operating position and the second operating position, and the trailer coupler mounting device a simple linear movement of the trailer coupling mounting device, specifically exclusively in the direction of the body vertical axis, is required in order to be able to set the trailer coupling mounting device from its rest position into its active position and vice versa. This can be implemented inexpensively, because only one movement direction of the trailer coupling mounting device and only one movement of the air-guiding device has to be implemented. Furthermore, the setting of the trailer coupling mounting device and of the air-guiding device is more operationally reliable owing to the in each case only single movement direction of both devices. A substantial advantage is the possibility of complete coverage of the trailer coupling mounting device in its rest position by means of the air-guiding device, such that, for example aside from an aerodynamic advantage of the motor vehicle body, fouling of the trailer coupling mounting device in its rest position is avoided.

In order that advantageous efficiency of the air-guiding device can be achieved, this is configured in the form of a rear-end diffuser adjoining an underbody of the motor vehicle body.

In one embodiment of the motor vehicle body according to aspects of the invention, the air-guiding device has a pivoting-movement kinematic mechanism by means of which said air-guiding device, in particular its active element, is settable into its operating positions. The advantage can be seen in the fact that the pivoting-movement kinematic mechanism can, for secured positioning of the air-guiding device, be assigned a blocking function which has, for example, a blocking element, for example in the form of a pin that can be engaged into the active element.

The trailer coupling mounting device is advantageously settable into its rest position or into its active position by means of a linear-movement kinematic mechanism. This linear-movement kinematic mechanism may be designed for example in the form of a rail and of a runner that is axially movable in the rail. The linear-movement kinematic mechanism serves for secured positioning of the trailer coupling mounting device.

In a further advantageous embodiment of the motor vehicle body according to aspects of the invention, the pivoting-movement kinematic mechanism is operatively connected to the linear-movement kinematic mechanism. It is thus advantageously possible for the linear-movement kinematic mechanism to be coupled to a movement of the pivoting-movement kinematic mechanism or vice versa, in such a way that a movement of the air-guiding device causes a movement of the trailer coupling mounting device.

For ease of operation, the air-guiding device and/or the trailer coupling mounting device is settable in fully electric fashion. In other words, this means that positioning of the air-guiding device and/or of the trailer coupling mounting device into their different positions can be effected "at the touch of a button".

Another aspect of the invention relates to a method for a motor vehicle body with an air-guiding device and with a trailer coupling mounting device, wherein the air-guiding device is formed in a rear-end region of the motor vehicle body, and wherein the trailer coupling mounting device can be adjusted into a rest position and into an active position, and wherein the trailer coupling mounting device, in at least the rest position, is at least partially covered with respect to surroundings by means of the air-guiding device, which can be moved into a first operating position and a second operating position. According to aspects of the invention, for the positioning of the trailer coupling mounting device into its active position, the air-guiding device is moved into its second operating position by pivoting about a pivot axis, and the trailer coupling mounting device is moved along a body vertical axis of the motor vehicle body after or together with the positioning of the air-guiding device into its second operating position. The advantage can be seen in the implementation of operationally reliable setting of the air-guiding device and of the trailer coupling mounting device owing to the simple movements.

BRIEF DESCRIPTION OF THE DRAWINGS

Further advantages, features and details of the invention will emerge from the following description of preferred exemplary embodiments and from the drawing. The features and feature combinations mentioned above in the description and the features and feature combinations mentioned below in the description of the figures and/or shown in the figures alone are able to be used not only in the respectively specified combination but also in other combinations or individually without departing from the scope of the invention. Identical or functionally identical elements are denoted by identical reference signs. For the sake of clarity, it may be the case that the elements are not denoted by their reference signs in all of the figures, but this does not eliminate the assignment thereof. In the drawings:

FIG. 1 shows, in a perspective illustration, a motor vehicle body with an air-guiding device and with a trailer coupling mounting device according to the prior art, with the air-guiding device in a first operating position, FIG. 2 shows, in a perspective illustration, the motor vehicle body as per FIG. 1, with the air-guiding device in a second operating position.

DETAILED DESCRIPTION OF THE INVENTION

Figure 3:
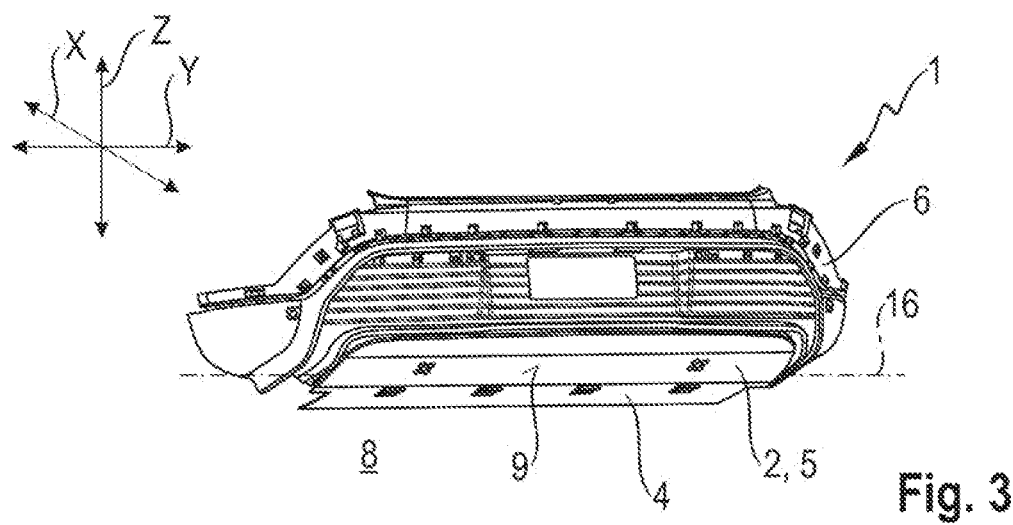
FIG. 3 shows, in a perspective illustration, a motor vehicle body according to aspects of the invention with the air-guiding device and with the trailer coupling mounting device, wherein the air-guiding device is in the first operating position.

A motor vehicle body 1 designed according to the prior art, comprising an air-guiding device in the form of a rear-end diffuser and a trailer coupling mounting device 3 for receiving a trailer (not illustrated in any more detail), is constructed as in FIGS. 1 and 2, in which the rear-end diffuser 2 is shown in its first operating position and in its second operating position respectively.

The rear-end diffuser 2, which adjoins an underbody 4 of the motor vehicle body 1, has a predominantly plate-like active element 5, which is received pivotably on a body component of the motor vehicle body 1 by means of a movement device (not illustrated in any more detail) of the rear-end diffuser 2. The body component 6 is designed in the form of a rear bumper of the motor vehicle body 1.

Figure 6:
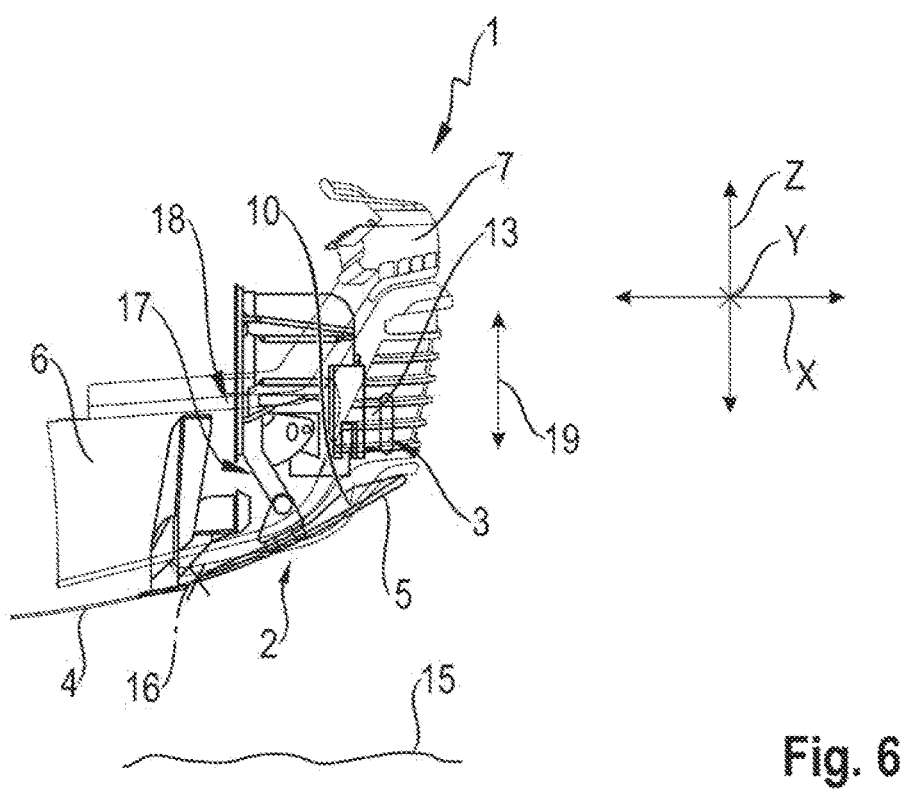
FIG. 6 shows, in a side view, the motor vehicle body according to aspects of the invention with the air-guiding device in its first operating position and the trailer coupling mounting device in its rest position.
Figure 7:
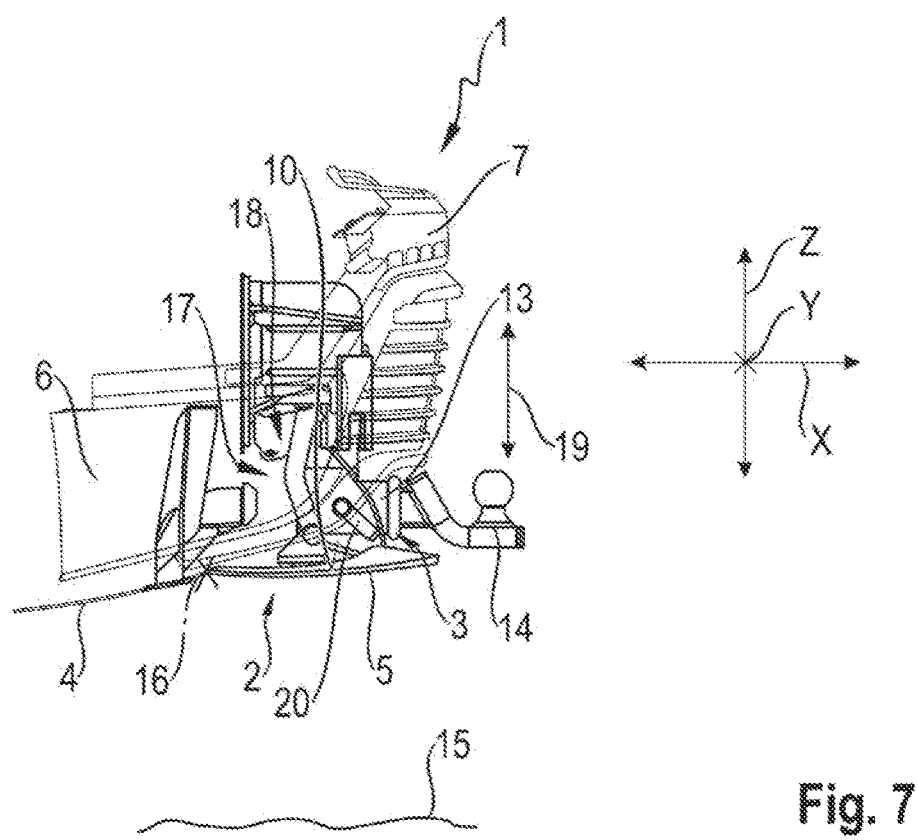
FIG. 7 shows, in a side view, the motor vehicle body according to aspects of the invention with the air-guiding device in its second operating position and the trailer coupling mounting device in its active position.

It would likewise be possible for the rear-end diffuser 2 to be formed, with the bumper 6, as a module component of the motor vehicle body 1, wherein, before the bumper 6 is installed on a frame (not illustrated in any more detail) of a motor vehicle that has the motor vehicle body 2, or on a further body component 7 of the motor vehicle body 2, the rear-end diffuser 2 is mounted movably on the bumper 6 in order to be attached jointly with the bumper 6 to the frame or to the further body component 7, preferably by way of a connection in the form of a snap-action connection. The further body component 7 is illustrated in FIGS. 6 and 7.

The active element 4 has a first element surface 9, which is configured to face toward surroundings 8, and a second element surface 10, which is configured to face away from the first element surface 9. On the second element surface 10, in the direction of a body transverse axis Y of the motor vehicle body 1, there are formed two sealing elements 11, between which there is situated a receiving space 12 which is provided for receiving the trailer coupling mounting device 3. It is pointed out at this juncture that the sealing element 11 does not have the function of a complete, in particular pressure-tight, seal.

Figure 5:
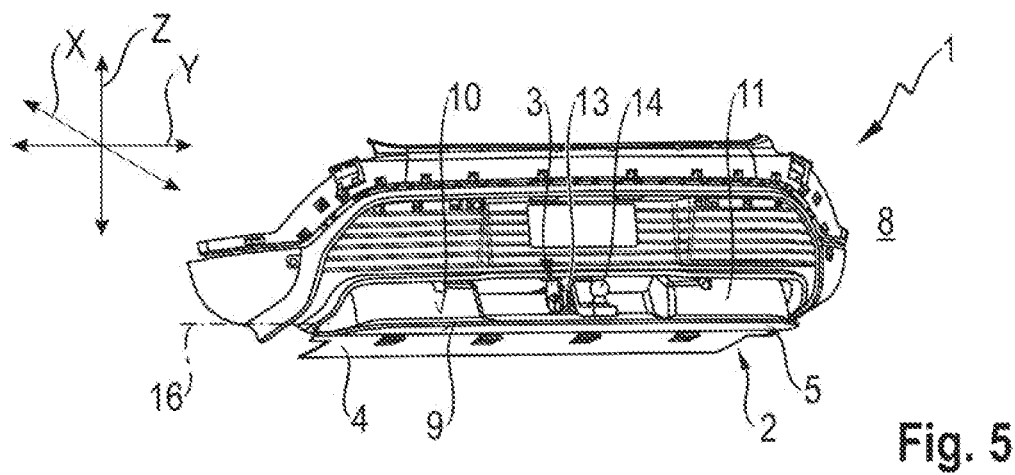
FIG. 5 shows, in a perspective illustration, the motor vehicle body as per FIG. 3, with the air-guiding device in a second operating position and the trailer coupling mounting device in its active position.

A receiving element 13 of the trailer coupling mounting device 3, which receiving element serves for receiving a coupling element 14 that is to be fastened to the trailer coupling mounting device 3, is visible in all operating positions of the rear-end diffuser 2, which, as well as having an adverse effect on aerodynamics owing to turbulence, has an adverse effect on the design. The coupling element 14 is shown in FIGS. 5 and 7. In order for the coupling element 14 to be received in a secured manner, said coupling element has an at least square cross section, wherein the receiving element 13 has a receiving cross section of complementary form. In the present exemplary embodiment, the coupling element 14 is plugged into the receiving element 13, that is to say the receiving element 13 is of hollow design, at least for receiving the coupling element 14 in a secured manner. It would likewise also be possible for the coupling element 14 to be plugged onto the receiving element 13, which implies that at least the coupling element 14 is at least partially of hollow form.

In order to avoid the adverse effects, the motor vehicle body 1 according to aspects of the invention has the trailer coupling mounting device 3, at least in its rest position, completely covered with respect to the surroundings 8 by means of the active element 4, as shown in FIG. 3, wherein FIG. 3 illustrates the rear-end diffuser 2 in its first operating position.

Figure 4:
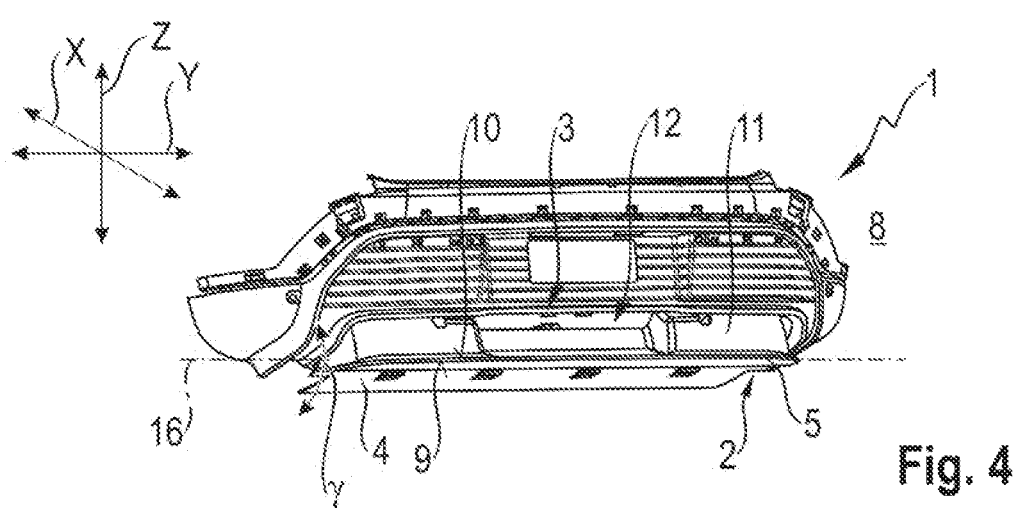
FIG. 4 shows, in a perspective illustration, the motor vehicle body as per FIG. 3, with the air-guiding device in the second operating position and the trailer coupling mounting device in its rest position.

FIG. 4 shows the motor vehicle body 1 according to aspects of the invention in a perspective illustration with the trailer coupling mounting device 3 and the rear-end diffuser 2 in its second operating position, wherein the rear-end diffuser 2 has been pivoted out of its first operating position in the direction of a roadway 15, as illustrated in FIGS. 6 and 7, and the trailer coupling mounting device 3 is in its rest position.

The rear-end diffuser 2 is configured to be pivotable about a pivot axis 16, which extends along the direction of the body transverse axis Y, through a pivot angle $\gamma$.

Before the trailer coupling mounting device 3 is positioned into its active position, the active element 4 is set into the second operating position toward the roadway 15. The trailer coupling mounting device 3 is then moved into its active position, as shown in FIGS. 5 and 7, by axial displacement along the body vertical axis Z.

It is pointed out at this juncture that a body longitudinal axis X of the motor vehicle body 1 is additionally likewise shown.

FIGS. 6 and 7 illustrate the motor vehicle body 1 according to aspects of the invention with the trailer coupling mounting device 3 in the rest position and active position respectively, and the rear-end diffuser 2 in the first operating position and the second operating position respectively, in a side view.

The active element 5 of the rear-end diffuser 2 is pivoted about the pivot axis by means of a pivoting-movement kinematic mechanism 17, whereas the trailer coupling mounting device is displaced rectilinearly in the direction of the body vertical axis Z in accordance with the movement arrow 19 by means of a linear-movement kinematic mechanism 18. In other words, this means that the pivoting-movement kinematic mechanism 17 is configured to effect a pivoting movement or a rotational movement, and the linear-movement kinematic mechanism 18 is designed to implement a rectilinear movement.

In the present exemplary embodiment, the pivoting-movement kinematic mechanism 17 and the linear-movement kinematic mechanism 18 are coupled to one another, in such a way that the pivoting-movement kinematic mechanism 17 triggers the linear-movement kinematic mechanism 18. In other words, this means that an initiation of the movement of the pivoting-movement kinematic mechanism 17 causes the movement of the linear-movement kinematic mechanism 18. This means that the pivoting-movement kinematic mechanism 17 is operatively connected to the linear-movement kinematic mechanism 18.

The pivoting-movement kinematic mechanism 17 may be operated fully electrically. Thus, for example for the mounting of the coupling element 14, the active position of the trailer coupling mounting device 3 can be set by, for example, manual actuation of an actuating element, for example a switch, which is not illustrated in any more detail and which is arranged in the region of the rear-end diffuser 2, for example in a luggage compartment (not illustrated in any more detail) of the motor vehicle body 1.

Thus, for the mounting of the coupling element 14 proceeding from the rest position of the trailer coupling mounting device 3 and the first operating position of the rear-end diffuser 2, the following method steps are necessary:

First step: Actuation of the actuating element, for example manually.

Second step: The rear-end diffuser 2 is pivoted into its second operating position by means of the pivoting-movement kinematic mechanism 17.

Third step: The trailer coupling mounting device 3 is set into its active position by means of the linear-movement kinematic mechanism 18, wherein said trailer coupling mounting device is displaced along the body vertical axis Z.

Fourth step: Mounting of the coupling element 14 on the trailer coupling mounting device 3 by virtue of the coupling element 14 being received in the receiving element 13 and the coupling element 14 being secured on the trailer coupling mounting device 3 by means of a securing element 20.

Advantageously, the trailer coupling mounting device 3 is displaced from its rest position toward the roadway 15, that is to say downward, such that, for the positioning of the trailer coupling mounting device 3 into its active position, an expenditure of force is reduced owing to the assistance provided by gravitational force.

If the coupling of the pivoting-movement kinematic mechanism 17 and of the linear-movement kinematic mechanism 18 is implemented as in the present exemplary embodiment, the second step and the third step may be combined as one step.

In order to secure the position of the rear-end diffuser 2 in the active position of the trailer coupling mounting device 3, blocking of the pivoting-movement kinematic mechanism 17 is effected by means of a blocking element (not illustrated in any more detail), wherein it is only after removal of the blocking element from its blocking position that the blocking is eliminated and it is made possible for the rest position of the trailer coupling mounting device 3 and the first operating position of the rear-end diffuser 2 to be set.

When the coupling element 14 has been removed and the trailer coupling mounting device 3 is to be set back into its rest position, this is likewise performed fully electrically and by actuation of the actuating element, in the present example the switch. It would likewise also be possible for the actuation element to be arranged in a passenger compartment of the motor vehicle body 1.

LIST OF REFERENCE SIGNS

1 Motor vehicle body
2 Air-guiding device

3 Trailer coupling mounting device
4 Underbody
5 Active element
6 Body component
7 Further body component
8 Surroundings
9 First element surface
10 Second element surface
11 Sealing element
12 Receiving compartment
13 Receiving element
14 Coupling element
15 Roadway
16 Pivot axis
17 Pivoting-movement kinematic mechanism
18 Linear-movement kinematic mechanism
19 Movement arrow
20 Securing element
X Body longitudinal axis
Y Body transverse axis
Z Body vertical axis
γ Pivot angle

What is claimed is:

1. A motor vehicle body comprising:
an air-guiding device formed in a rear-end region of the motor vehicle body, the air-guiding device being settable into a first operating position and a second operating position; and
a trailer coupling mounting device that is adjustable into a rest position and into an active position, and wherein the trailer coupling mounting device, in at least the rest position, is at least partially covered with respect to surroundings by the air-guiding device,
wherein for positioning the trailer coupling mounting device into the active position, the air-guiding device is first settable into the second operating position and, after or together with positioning the air-guiding device into the second operating position, the trailer coupling mounting device is configured to be movable along a body vertical axis (Z) of the motor vehicle body,
wherein the air-guiding device has a pivoting-movement kinematic mechanism by means of which said air-guiding device is settable into the operating positions,
wherein the trailer coupling mounting device has a linear-movement kinematic mechanism by means of which said trailer coupling mounting device is linearly translatable along the body vertical axis (Z) between the rest position and the active position.

2. The motor vehicle body as claimed in claim 1, wherein the air-guiding device is a rear-end diffuser adjoining an underbody of the motor vehicle body.

3. The motor vehicle body as claimed in claim 1, wherein the pivoting-movement kinematic mechanism is operatively connected to the linear-movement kinematic mechanism such that the trailer coupling mounting device moves into the active position at a same time as the air-guiding device moves into the second operating position.

4. The motor vehicle body as claimed in claim 1, wherein the air-guiding device and/or the trailer coupling mounting device are electrically settable.

5. The motor vehicle body as claimed in claim 1, further comprising a receiving element that is assigned to the trailer coupling mounting device and is configured to receive a coupling element.

6. The motor vehicle body as claimed in claim 5, wherein, in order for the coupling element to be received in a secured manner, said coupling element has an at least square cross section, and wherein the receiving element has a receiving cross section of complementary form.

7. The motor vehicle body as claimed in claim 5, wherein the coupling element is secured on the receiving element by a securing element.

8. The motor vehicle body as claimed in claim 5, wherein the coupling element is a tow hitch, and the trailer coupling mounting device does not comprise the tow hitch.

9. The motor vehicle body as claimed in claim 1, wherein the trailer coupling mounting device, in the rest position, is completely covered by the air-guiding device.

10. The motor vehicle body as claimed in claim 1, wherein the trailer coupling mounting device moves into the active position without rotation.

11. In a motor vehicle body with an air-guiding device and with a trailer coupling mounting device, wherein the air-guiding device is formed in a rear-end region of the motor vehicle body, and wherein the trailer coupling mounting device can be adjusted into a rest position and into an active position, and wherein the trailer coupling mounting device, in at least the rest position, is at least partially covered with respect to surroundings by the air-guiding device, which can be moved into a first operating position and a second operating position, wherein the air-guiding device has a pivoting-movement kinematic mechanism by means of which said air-guiding device is settable into the operating positions, and wherein the trailer coupling mounting device has a linear-movement kinematic mechanism by means of which said trailer coupling mounting device is linearly translatable along a body vertical axis (Z) between the rest position and the active position, a method of adjusting the motor vehicle body comprises:
moving the air-guiding device into the second operating position, and
either after or together with moving the air-guiding device into the second operating position, moving the trailer coupling mounting device into the active position by linearly translating the trailer coupling mounting device along the body vertical axis (Z) of the motor vehicle body.

12. The method as claimed in claim 11, wherein the pivoting-movement kinematic mechanism is operatively connected to the linear-movement kinematic mechanism such that the trailer coupling mounting device moves into the active position at a same time as the air-guiding device moves into the second operating position.

13. The method as claimed in claim 11, wherein moving the air-guiding device into the second operating position comprises rotating the air-guiding device into the second operating position.

14. The method as claimed in claim 11, wherein the trailer coupling mounting device moves into the active position without rotation.

15. The method as claimed in claim 11, wherein the motor vehicle body further comprises a receiving element that is assigned to the trailer coupling mounting device and is configured to receive a coupling element.

16. The method as claimed in claim 15, wherein the coupling element is a tow hitch, and the trailer coupling mounting device does not comprise the tow hitch.

* * * * *